United States Patent
Bernard et al.

(10) Patent No.: US 7,160,520 B1
(45) Date of Patent: Jan. 9, 2007

(54) AIR PURIFYING EQUIPMENT IN PARTICULAR FOR AIRCRAFT PASSENGER COMPARTMENT

(75) Inventors: Jean-Loup Bernard, Solignac (FR); Pascal Contini, Isle (FR); Thierry Mantel, Isle (FR)

(73) Assignee: Sofrance, Nexon (FR)

( * ) Notice: Subject to any disclaimer, the term of this patent is extended or adjusted under 35 U.S.C. 154(b) by 1325 days.

(21) Appl. No.: 09/762,990

(22) PCT Filed: Jun. 19, 2000

(86) PCT No.: PCT/FR00/01626

§ 371 (c)(1),
(2), (4) Date: Apr. 12, 2001

(87) PCT Pub. No.: WO00/76846

PCT Pub. Date: Dec. 21, 2000

(30) Foreign Application Priority Data

Jun. 14, 1999 (FR) .................................. 99 07488

(51) Int. Cl.
B01D 50/00 (2006.01)
B01D 53/34 (2006.01)
(52) U.S. Cl. .................... 422/177; 422/168; 422/169
(58) Field of Classification Search ............... 422/177, 422/168, 169, 172
See application file for complete search history.

(56) References Cited

U.S. PATENT DOCUMENTS

| | | | | |
|---|---|---|---|---|
| 3,067,560 A | * | 12/1962 | Parker | 96/152 |
| 3,084,024 A | * | 4/1963 | Simon et al. | 423/219 |
| 3,340,680 A | * | 9/1967 | Fields et al. | 95/36 |
| 3,457,040 A | * | 7/1969 | Jennings | 210/194 |
| 3,720,501 A | * | 3/1973 | Cramer et al. | 422/123 |
| 5,181,995 A | * | 1/1993 | Kummer | 205/464 |
| 5,294,410 A | * | 3/1994 | White | 422/171 |
| 5,368,816 A | | 11/1994 | Detzer | |
| 5,733,515 A | * | 3/1998 | Doughty et al. | 423/210 |
| 5,791,982 A | | 8/1998 | Curry et al. | |

FOREIGN PATENT DOCUMENTS

EP 2 317 688 A 1/1998

OTHER PUBLICATIONS

Preliminary Search Report dated Feb. 7, 2000 (FR 9907488, FA 572528).

* cited by examiner

*Primary Examiner*—M. Alexandra Elve
(74) *Attorney, Agent, or Firm*—Blakely Sokoloff Taylor & Zafman

(57) ABSTRACT

The invention concerns an air purifying equipment characterized in that it comprises means (10, 20, 30, 40) for injecting into the air to be purified a water spray laden with nascent oxygen. The invention is particularly useful for treating air in an aeroplane.

14 Claims, 1 Drawing Sheet

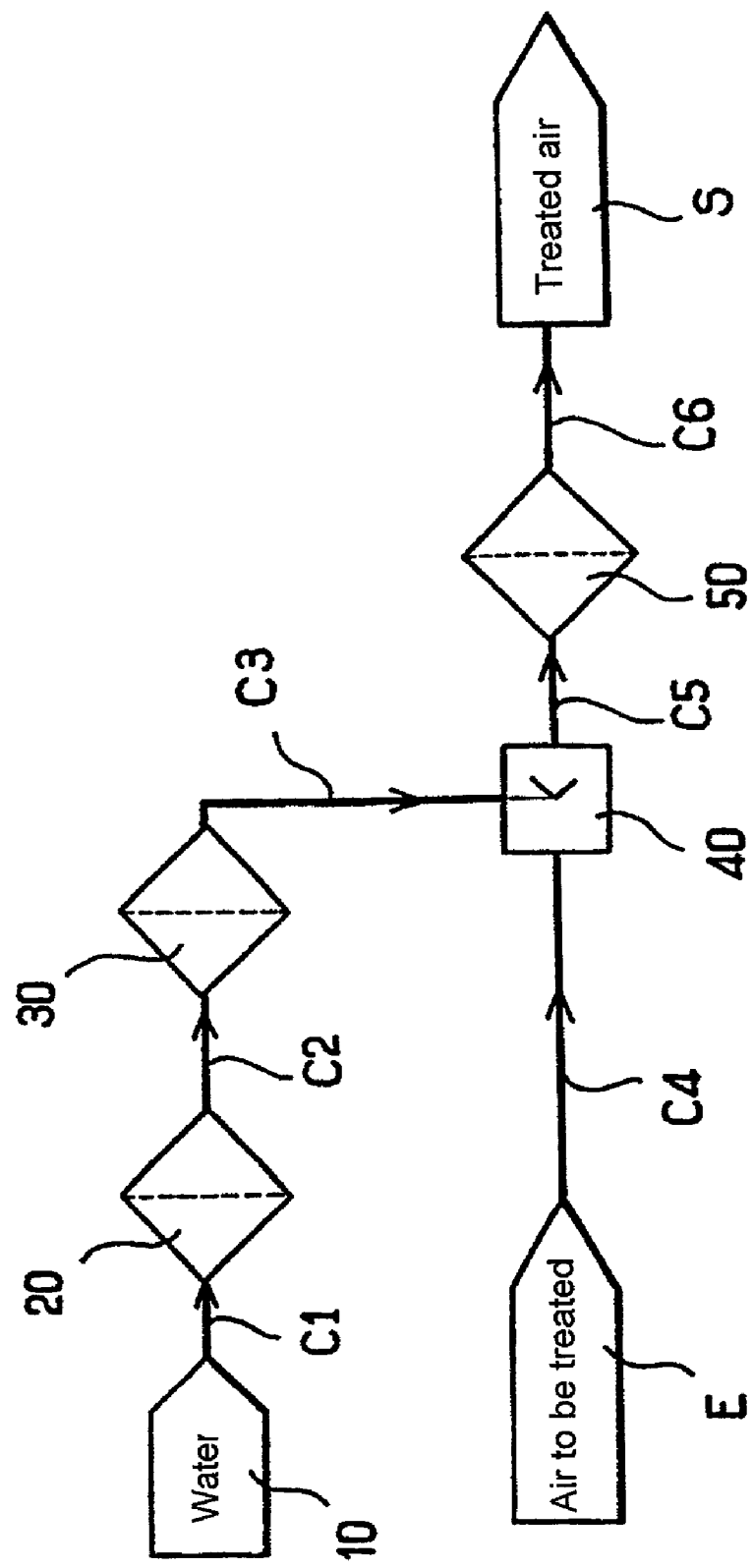

AIR PURIFYING EQUIPMENT IN PARTICULAR FOR AIRCRAFT PASSENGER COMPARTMENT

BACKGROUND OF THE INVENTION

1. Field of the Invention

The present invention relates in general to apparatus for treating air, in particular the air in aircraft cabins.

2. Description of Related Art

The quality of air in an aircraft cabin is a problem that involves numerous parameters. Thus, the air must comply with maximum acceptable concentrations both for microparticles and for microorganisms, so as to ensure that the air is well tolerated by human beings.

Furthermore, mainly for reasons of comfort, it is desirable for its relative humidity and its odoriferous molecular content to be situated at "comfort" values.

Conventional equipment for treating cabin air comprises apparatus for mixing air that has been recycled from the cabin with new air taken from outside the aircraft, the air being filtered with a conventional particle filter.

That conventional approach gives rise to several problems:

firstly, a particle filter is very poorly suited to purifying air containing various forms of microorganism; thus, the air recycled from the cabin is purified essentially only from the particle point of view and it is reinjected into the cabin without the microorganisms contained therein being eliminated to any significant extent; furthermore, those microorganisms which are indeed stopped by the filter proliferate thereon, taking nourishment from the various particles that the filter stops; it is also known that such a particle filter is unsuitable for stopping virus type microorganisms; finally, it should be observed that odoriferous molecules (cooking odors, kerosene odors, human odors, etc.) are not stopped by such a filter;

secondly, it is necessary to replace the filter in extremely regular manner;

thirdly, new air needs to be taken from outside the aircraft (and in practice air which is already relatively hot and taken from the aircraft engines) leading directly to a loss of engine power; as an example, renewing cabin air to the extent of 25% typically gives rise to a loss of engine power of about 1%; it will be understood that this goes specifically against recent trends of achieving the maximum possible savings in terms of aircraft consumption; and finally, the fact that a large proportion of cabin air is renewed presents the drawback of delivering air into the cabin that is extremely dry; typically, air taken from the outside has relative humidity in the vicinity of 5%, whereas the comfort threshold is situated at about 40%.

To resolve this last problem, it is known to associate the cabin air treatment equipment with a humidifier, however the other problems are not resolved; on the contrary, adding water to the air for treatment can encourage the development of certain microorganisms.

Another known solution consists in causing the air taken from the cabin for recycling purposes to pass over silica gel; the air that has been dried in this way is delivered to the cabin of the aircraft to reduce condensation phenomena therein, and the recovered water is used for humidifying new air. This likewise gives rise to problems of bacteria proliferating, given that silica gel constitutes a good medium for such proliferation.

Finally, it is known that air treatment apparatus including a particle filter can be associated with an activated carbon filter which stops microorganisms and odoriferous molecules better; however that gives rise to new problems: firstly, the head losses in the air treatment circuit are significantly increased, thus making it necessary to use more powerful air-circulation fans with an undesirable increase in energy consumption on board the aircraft; secondly the effectiveness of such an activated carbon filter is very limited in time, so it needs to be changed on practically every stopover; and finally such carbon filters are known to constitute excellent media for bacterial proliferation; for these reasons, such carbon filters are practically never used.

BRIEF SUMMARY OF THE INVENTION

The present invention seeks to mitigate those limitations in the state of the art and to propose cabin air treatment equipment:

which is effective, in particular presenting remanent action;

whose energy consumption remains moderate; and finally which makes it possible to obtain relative humidity in so-called "comfort" ranges, without it being necessary to provide a special humidifier.

Thus, the present invention provides equipment for purifying air, in particular aircraft cabin air, the equipment being characterized in that it comprises means for injecting a spray of water laden with nascent oxygen into the air to be purified.

Other preferred but non-limiting features of the equipment of the present invention are as follows:

the equipment further comprises a particle filter interposed on the path of the air to be treated;

the particle filter includes adsorption means;

the means for injecting a spray of water laden with nascent oxygen comprise a source of mineralized water and an activator in which the mineralized water is put into contact with a metallic catalyst of suitable purity;

the metallic catalyst is a precious metal such as silver;

the metallic catalyst is provided on a medium having large specific surface area;

the source of mineralized water comprises a supply of water that is mineralized little or not at all, and a mineralization reactor;

for use in an aircraft having at least one engine with an associated compressor, the water supply is fed from condensates coming from said compressor;

the means for injecting a spray of water laden with nascent oxygen further comprise a mixing chamber receiving both the air to be treated and the water laden in nascent oxygen from the activator;

the particle filter can be located downstream or upstream from the mixing chamber; and the equipment further comprises means for mixing the purified air with new air.

BRIEF DESCRIPTION OF THE DRAWINGS

Other features, objects and advantages of the present invention will appear more clearly on reading the following detailed description of a preferred embodiment thereof, given by way of non-limiting example and made with reference to the accompanying drawing, in which the sole figure is a block diagram of cabin air treatment equipment of the present invention.

DETAILED DESCRIPTION OF THE INVENTION

This installation comprises a supply of water 10 which advantageously contains water taken from the condensates of the compressors associated with the engines of the aircraft. In general, this condensation water is poor in minerals.

The water contained in this supply is conveyed by a pipe C1 to a mineralization reactor 20 for increasing the mineral content of the incoming water. By way of example, this reactor can be constituted by a cartridge possessing an inlet for water to be mineralized and an outlet for mineralized water, and containing an inorganic compound in oxygenized form, e.g. calcium carbonate.

The equipment further comprises an activator 30 having an inlet connected to the outlet of the reactor 20 by a pipe C2. This activator is preferably constituted by a catalytic cartridge such as a folded cartridge based on activated carbon cloth, on which a layer of catalyst has been deposited. The catalyst is preferably constituted by metallic silver of suitable purity, or by some other precious metal.

In this activator, the inorganic salt contained in the water reacts with the catalyst to form nascent oxygen, in particular molecules of $O_3$, of $O_2^-$, $OH^-$, etc.

For further details about how to implement such an activator, reference can be made to the article "Carbon, Vol. 36, Nos. 1–2, pp. 61–65, 1998".

The outlet from the activator 30 is connected by a pipe C3 to a first inlet of a mixing chamber 40. Another inlet to said chamber 40 receives, via a pipe C4, air for treatment that had been taken from the aircraft cabin.

This mixing chamber operates, for example, on the principle of a Venturi mixer, and serves to spray into the air to be treated water containing nascent oxygen of the kind generated at the outlet from the activator 30.

This nascent oxygen is strongly oxidizing and is therefore distributed in generally uniform manner throughout the air that is delivered to the cabin, and as a result organic compounds (odors, microorganisms, . . . ) present in the recycled air are progressively oxidized over time, thereby causing them to be destroyed.

The outlet from the mixing chamber is connected by a pipe C5 to the inlet of a particle filter 50 of conventional type. Optionally, the filter can also perform an adsorption function, e.g. by incorporating activated carbon cloth.

At the outlet from the filter 50, the air is delivered to the cabin via a pipe C6.

It will be understood that by means of such equipment, a spray of water containing nascent oxygen is introduced into the air for recycling, and the action of the nascent oxygen can take place progressively, and thus with excellent efficiency.

In particular, initial oxidation reactions on compounds to be destroyed will take place as soon as the mixture is formed, and thereafter also in the pipes C5 and C6, and finally they continue in the cabin. This thus constitutes remanent action that is particularly effective.

In addition, the nascent oxygen present in the mixture reaching the filter 50 also has the power of destroying compounds that have previously accumulated in the filter, and thus of avoiding any proliferation of microorganisms on the surface of the filter.

It should be observed at this point that any viruses, bacteria, and microbes contained in the air to be treated in the filter 50 are destroyed without releasing endotoxins, and this is particularly advantageously.

It would also be observed that because water is introduced into the air to be treated, it is easy to maintain the humidity of this air at a comfortable level.

Naturally, the equipment further comprises appropriate devices both for circulating the air to be treated (a suction fan or a blower) and for circulating water upstream or downstream from the reactor 20 or the activator 30 (a pump).

In addition, the person skilled in the art knows how to apply numerous variants or modifications to the present invention.

In particular, the present invention can be implemented together with apparatus for delivering a fraction of new air. Under such circumstances, the new air is mixed with the recycled air at a point that is preferably downstream from the filter 50.

Furthermore, the catalyst provided in the activator 30 can be provided on any medium that has sufficient specific surface area, such as silica, alumina, a clay, or a zeolite.

The invention is applicable not only to treating aircraft cabin air, but more generally in any other domain such as that of clean environments for the food industry, in hospitals, the field of conditioning air in buildings of all kinds, . . . .

The invention claimed is:

1. Equipment for purifying air, in particular aircraft cabin air, the equipment being characterized in that it comprises means (10, 20, 30, 40) for injecting a spray of water laden with nascent oxygen into the air to be purified.

2. Equipment according to claim 1, characterized in that it further comprises a particle filter (50) interposed on the path of the air to be treated.

3. Equipment according to claim 2, characterized in that the particle filter (50) includes adsorption means.

4. Equipment according to any one of claims 1 to 3, characterized in that the means for injecting a spray of water laden with nascent oxygen comprise a source of mineralized water (10, 20) and an activator (30) in which the mineralized water is put into contact with a metallic catalyst of suitable purity.

5. Equipment according to claim 4, characterized in that the metallic catalyst is a precious metal such as silver.

6. Equipment according to claim 5, characterized in that the metallic catalyst is provided on a medium having large specific surface area.

7. Equipment according to claim 5, or claim 6, characterized in that the source of mineralized water comprises a supply (10) of water that is mineralized little or not at all, and a mineralization reactor (20).

8. Equipment according to claim 7, used in an aircraft having at least one engine with an associated compressor, characterized in that the water supply (10) is fed from condensates coming from said compressor.

9. Equipment according to claim 4, characterized in that the means for injecting a spray of water laden with nascent oxygen further comprise a mixing chamber (40) receiving both the air to be treated and the water laden in nascent oxygen from the activator (30).

10. Equipment according to claim 1, characterized in that it further comprises means for mixing the purified air with new air.

11. Equipment according to claim 1, further comprising:
a particle filter (50) located downstream from the mixing chamber and interposed on the path of the air to be treated, wherein the metallic catalyst is a precious metal and the source of mineralized water includes a supply (10) of water that is one of not mineralized and mineralized; and
a mineralization reactor (20).

12. Equipment according to claim 1, further comprising:
a particle filter (50) located downstream from the mixing chamber and interposed on the path of the air to be treated, wherein the particle filter (50) includes adsorption means, and the metallic catalyst is a precious metal and the source of mineralized water comprises a supply (10) of water that is one of mineralized and not mineralized; and a mineralization reactor (20).

13. Equipment according to claim 1, further comprising;

a particle filter (50) located upstream from the mixing chamber and interposed on the path of the air to be treated, wherein the metallic catalyst is a precious metal and the source of mineralized water comprises a supply (10) of water that is one of mineralized and not mineralized; and a mineralization reactor (20).

14. Equipment according to claim 1, further comprising;

a particle filter (50) located upstream from the mixing chamber and interposed on the path of the air to be treated, wherein the particle filter (50) includes adsorption means, and the metallic catalyst is a precious metal and the source of mineralized water comprises a supply (10) of water that is one of mineralized and not mineralized; and a mineralization reactor (20).

* * * * *